United States Patent
Fung et al.

(10) Patent No.: US 10,403,865 B2
(45) Date of Patent: Sep. 3, 2019

(54) ALUMINUM FILM PACKAGING MATERIALS USED FOR LITHIUM BATTERIES

(71) Applicant: NAN YA PLASTICS CORPORATION, Taipei (TW)

(72) Inventors: Dein-Run Fung, Taipei (TW); Ying-Te Huang, Taipei (TW); Chao-Hsien Lin, Taipei (TW); Ching-Yao Yuan, Taipei (TW); Teng-Ko Ma, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 241 days.

(21) Appl. No.: 14/505,713

(22) Filed: Oct. 3, 2014

(65) Prior Publication Data

US 2015/0104698 A1  Apr. 16, 2015

(30) Foreign Application Priority Data

Oct. 11, 2013  (TW) .............................. 102136702 A (51) Int. Cl.
*H01M 2/02* (2006.01)
*H01M 10/052* (2010.01)

(52) U.S. Cl.
CPC ....... *H01M 2/0287* (2013.01); *H01M 2/0277* (2013.01); *H01M 2/0285* (2013.01); *H01M 10/052* (2013.01)

(58) Field of Classification Search
None
See application file for complete search history.

(56) References Cited

U.S. PATENT DOCUMENTS

| 5,445,856 | A | * | 8/1995 | Chaloner-Gill | ......... | B32B 27/18 428/124 |
| 5,750,630 | A | * | 5/1998 | Sengupta | ........... | C08G 18/0823 524/457 |
| 7,285,334 | B1 | * | 10/2007 | Yamashita | .......... | H01M 2/0267 428/220 |
| 2002/0037415 | A1 | * | 3/2002 | Chang | ....................... | B32B 7/12 428/423.1 |
| 2004/0089848 | A1 | * | 5/2004 | Palaniappan | .......... | H01B 1/128 252/500 |
| 2006/0093906 | A1 | * | 5/2006 | Yamashita | .............. | B32B 15/08 429/176 |

(Continued)

*Primary Examiner* — Haroon S. Sheikh
(74) *Attorney, Agent, or Firm* — Li & Cai Intellectual Property (USA) Office (57) ABSTRACT

A method for lithium aluminum film packaging materials, with water, high temperature and corrosion resistance, the substrate layer, and then layer, aluminum foil layer, anti-corrosion layer, adhesive layer and the inner layer together constitute from the outermost to innermost layer laminate structure in which one side of the aluminum foil layer, or both side surface of the conductive coating material to said coating and curing anticorrosive layer, and the use of fluorine-containing polyurethane resin constituting the laminated rubber layer and the inner layer of corrosion between the adhesive layer, used lithium batteries as plastic film packaging applications, it can promote lithium battery with Merit water resistance, high temperature resistance and corrosion resistance, and enhance the use of lithium batteries in years.

2 Claims, 2 Drawing Sheets

(56) References Cited

U.S. PATENT DOCUMENTS

2008/0305341 A1* 12/2008 Plieth .................... B82Y 30/00
                                                          428/419
2013/0209868 A1*  8/2013 Suzuta ................ H01M 2/0275
                                                          429/176

* cited by examiner

ALUMINUM FILM PACKAGING MATERIALS USED FOR LITHIUM BATTERIES

BACKGROUND OF THE PRESENT INVENTION

1. Field of the Invention

The present invention relates to an aluminum film packaging material used for lithium batteries, and more particularly, to a laminated aluminum plastic film packaging material having excellent properties of water resistance, heat resistance and corrosion resistance as well as suitably applied to lithium batteries to increase lithium battery's service year.

2. Description of Related Art

The lithium cells or batteries if under the premise of having the same capacity is required to be light in weight, thin in thickness and long in service's life, in addition to having external shape of the lithium cells or batteries changed from original columnar shape to flat shape, the packaging material is also changed from the metal shell to soft laminated aluminum plastic film. Resulted in that the lithium batteries packed with soft laminated aluminum plastic film has been widely used in iPhone, iPad, Ultrabook and other 3C products. Presently, it is actively developed by designers for applying to electric vehicle, and so forth.

The structure of lithium batteries' laminated aluminum plastic film is similar to that of food flexible composite film structure. For example, both have a laminated structure consisted of an outermost layer, an intermediate layer (or barrier layer) and an innermost layer thereof. By means of the adhesive, an adhesive layer is formed as an interleave layer not only to be coated in between the outermost layer and the intermediate layer as well as between the intermediate layer and the innermost layer, but also finally to construct the outermost layer, the intermediate layer and the innermost layer as a wholly laminated aluminum plastic film. Each layer of the laminated aluminum plastic film is described as follows:

1. The Outermost Layer:

During making lithium cells or batteries, the outermost layer has to protect the intermediate layer from being scratched and guarantee a preformed laminate aluminum plastic film to be continuously operated to get an excellent final product. Moreover, in normal stage of using the lithium cells or batteries, the outermost layer also has to protect internally relevant structure thereof. In conclusion, the outermost layer is required for having properties excellent in impact resistance, puncture resistance, heat resistance and abrasion resistance as well as excellent in insulating capability.

2. The Intermediate Layer:

The lithium cells or batteries require extremely good resistance to water vapor and good adhesive strength to ensure heat seal for the cells or batteries has not been affected thereof. As a result, the intermediate layer is required for having good anti-pinhole property, stable press formability and good both-sided workability.

3. The Innermost Layer:

Since the lithium cells or batteries require a long shelf-life, the innermost layer is required for having properties excellent in organic solvent resistance, thermal adhesive capability and stable strength of heat seal. The innermost layer if limited to have too large coefficient of friction shall possess a good press formability to guarantee a steady process for producing the cells or batteries.

Moreover, during making a vacuum pumping process for producing the lithium cells or batteries, the innermost layer is apt to be punched and damaged from a lithium battery tab having sharpen metal buns, and the damaged appearance to the innermost layer may lead to the innermost layer's material generated an adverse negative outcomes. Thus, the innermost layer is further required for having a good anti-pinhole capability.

An electrolyte solution of lithium hexafluorophosphate ($LiPF_6$) for use in the lithium cells or batteries is easy to form hydrogen fluoride (HF) if reacted with water vapor, and the hydrogen fluoride (HF) is highly corrosive to the structural layers of lithium batteries' laminated aluminum plastic film and then causes the lithium cells or batteries having adverse defects in respects of short circuit, explosion and expansion, etc. For solving the problem mentioned above, we set stricter requirements for multi-layered structure of lithium batteries' laminated aluminum plastic film than for food flexible composite film structure.

For improvement over the above-mentioned requirements, prior art has disclosed some related technologies. For instance:

U.S. publication no. 2002142178A disclosed a polymer battery module packaging sheet includes, as essential components, a base layer, an aluminum layer, chemical conversion coatings coated onto the opposite surfaces of the aluminum layer, and an innermost layer. The chemical conversion coatings are formed from phosphoric acid chromate by processing the opposite surfaces of the aluminum layer by a phosphate treatment method. The base layer and the innermost layer are bonded to the chemical conversion coatings of the aluminum layer with adhesive layers, respectively.

Japanese publication no. 2005063685 is disclosed a packaging material for a cell case, which includes an outer layer formed from a heat-resistant resin film, a core layer formed from an aluminum foil, and an inner layer formed from a thermoplastic resin film. In particular, the core layer and inner layer are attached to each other by adhesive compositions which essentially consist of polyolefin polyol and multi-functional isocyanate hardener. The packaging material for a cell case is provided to prevent aged deterioration of adhesive strength between the core layer and the inner resin layer, to reduce moisture permeability, and to give excellent shape ability.

U.S. No. 2010255365 disclosed a packing material for a lithium cell includes a first adhesive layer, an aluminum foil layer, a coating layer, an adhesive resin layer or a second adhesive layer, and a sealant layer laminated sequentially on one surface of a base material layer, wherein the coating layer is a multilayer structure comprising a layer (A), in which 1 to 100 parts by mass of a phosphoric acid or a phosphate has been blended into 100 parts by mass of a rare earth element-based oxide, and a layer (X) which contains an anionic polymer and a cross-linking agent that causes cross-linking of the anionic polymers.

However, those above-mentioned packaging materials for use in making a lithium cell still do not meet lithium cell's demand for acid resistance and water resistance requirements.

SUMMARY OF THE INVENTION

The primary purpose of the present invention is to provide an aluminum plastic film packaging material has an appropriate elongation as well as has excellent properties in respects of heat resistance, water resistance, acid resistance, impact resistance, tear resistance and breakage resistance and further allows the aluminum plastic film packaging material is so suitably formed as packing material for lithium cells or batteries that the cells or batteries have been satisfied those stricter requirements for acid resistance and water resistance and have an effectively extended service life.

The aluminum plastic film packaging material has a laminated structure suited to be formed as packing material for lithium cells or batteries lithium battery, the improvement of the laminated structure at least comprises a substrate layer provided with a capability of heat resistance and formed from a nylon film or a polyester film having a thickness of ranging between 10 μm and 50 μm; an aluminum foil layer bonded to the substrate layer, provided with a capability of hydrofluoric acid resistance, formed from a soft aluminum foil containing 0.1-5 wt % of iron element and 0.1-5 wt % of silicon element and having a foil thickness of ranging between 30 μm and 100 μm; an innermost layer provided with a capability of heat seal for use in contact with electrolytes of a lithium battery and formed from a polyolefin-based polymer film having a thickness of ranging between 10 μm and 60 μm; an anti-corrosive layer coated onto one side or both sides of the aluminum foil layer and formed from a conductive coating having a thickness of ranging between 10 nm and 500 nm; and an adhesive layer coated as an interleaved layer between the anti-corrosive layer and the innermost layer; wherein the adhesive layer is formed from a fluorine-containing polyurethane bonding adhesive comprising:

a) 65-92 wt % polyol composition;
b) 0.5-8.0 wt % hydroxyl-containing modified fluorocarbon resins, preferably 0.5-4.5 wt %; which has a chemical structure as follows:

Where, F is fluorine; X, Y, Z is a halogen or hydrogen (H); and m, n is a positive integer greater than zero; and c) 5-30 wt % epoxy resin, preferably 5-15 wt %; each by weight of the fluorine-containing polyurethane adhesive.

The anti-corrosive layer contributes the aluminum plastic film packaging material has excellent capabilities of corrosion-proof, vapor-proof and conductivity. And, the conductive coating for use in making the anti-corrosive layer is selected from the group consisting of polyaniline, polypyrrole, polythiophene and any combination thereof.

The adhesive layer contributes the aluminum plastic film packaging material has excellent acid resistance and solvent resistance, when the fluorine-containing polyurethane bonding adhesive contained of biphenyl-formaldehyde novolac epoxy resin is intentionally used to be formed as the adhesive layer.

The adhesive layer contributes the aluminum plastic film packaging material has an excellent softness, when the fluorine-containing polyurethane bonding adhesive contained of bisphenol A epoxy resin is intentionally used to be formed as the adhesive layer.

The adhesive layer contributes the aluminum plastic film packaging material has an excellent rigidity, when the fluorine-containing polyurethane bonding adhesive, contained of any one of phenol-formaldehyde novolac epoxy resin, biphenyl-formaldehyde novolac epoxy resin and naphthalene-formaldehyde novolac epoxy resin, is intentionally used to be formed as the adhesive layer.

The adhesive layer contributes the aluminum plastic film packaging material has excellent press formability as well as electrolyte solution resistance, when the fluorine-containing polyurethane bonding adhesive contained of blended epoxy resins mixing from two or more different above-mentioned epoxy resins is intentionally used to be formed as the adhesive layer.

The invented aluminum plastic film packaging material with laminated structure has excellent properties in respects of heat resistance, water resistance, acid resistance and corrosion resistance. Lithium cells or batteries, if used the invented aluminum plastic film packaging material to be formed as its packaging material thereof, have an advantageous effect in that no hydrogen fluoride (HF) can be generated because the electrolyte solutions of lithium hexafluorophosphate ($LiPF_6$) of the lithium cells or batteries are effectively prevented from reaction with water vapor. Therefore, the lithium cells or batteries have no adverse defects in respects of short circuit, explosion and expansion and extend an excellent service life.

BRIEF DESCRIPTION OF THE DRAWINGS

The following drawings illustrate examples and corresponding diagrams to describe the technical content and characteristics of the present invention.

DETAILED DESCRIPTION OF THE INVENTION

Figure 1:
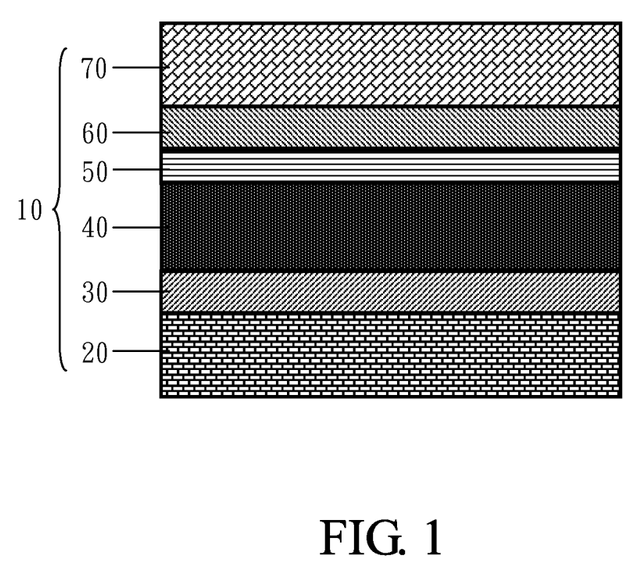
FIG. 1 is a cross-sectional view illustrating one example of an aluminum plastic film packaging material for a lithium cell according to the present invention.

As shown in FIG. 1, the present invention is an aluminum plastic film packaging material 10 (hereinafter referred to as APF packing material 10) with laminated structure, which is suitable for use in making a plastic film packaging for lithium cells or batteries.

The APF packing material 10 of the present invention has an appropriate elongation as well as has excellent properties in respects of impact resistance, tear resistance and breakage resistance etc., so that the APF packing material 10 is capable of being formed by a cold forming process.

The APF packing material 10 of the present invention has two kinds of different laminated structures, one laminated structure of the APF packing material 10 formed as a first embodiment of the invention is shown in FIG. 1, which laminated structure includes a substrate layer 20 with heat resistance a bonding layer 30, an aluminum foil layer 40, an anti-corrosive layer 50, an adhesive layer 60 and an innermost layer 70 formed from a thermoplastic resin film, laminated sequentially on one surface of the substrate layer 20 thereof. The novel structure of the APF packing material 10 shown in first embodiment is that the aluminum foil layer 40 due to having its one side tightly stuck to the anti-corrosive layer 50 is provided with a water-resistance capability as well as an acid-resistance capability to prevent the aluminum foil layer 40 from being corroded.

Figure 2:
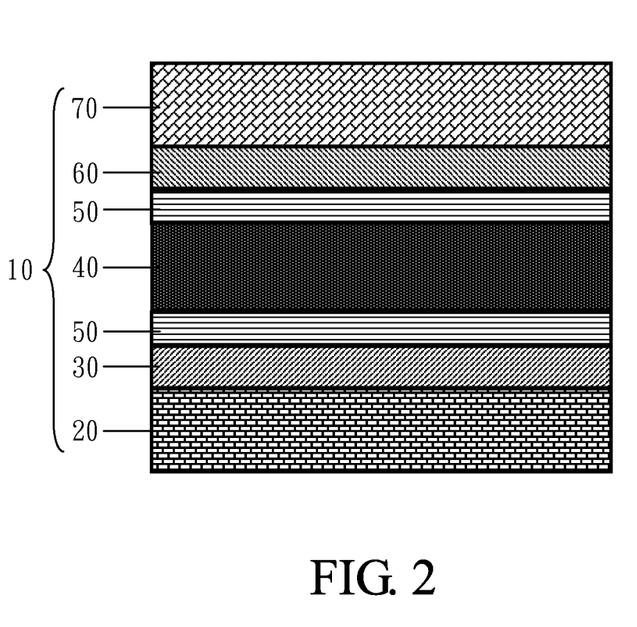
FIG. 2 is a cross-sectional view illustrating another example of an aluminum plastic film packaging material for a lithium cell according to the present invention.

Another laminated structure of the APF packing material 10 formed as a second embodiment of the invention is shown in FIG. 2, which laminated structure in addition to comprising two anti-corrosive layer 50 has the same structural composition as that of the first embodiment of the APF packing material 10. The secondly structural embodiment of the APF packing material 10 of the present invention allows both opposite sides of the aluminum foil layer 40 tightly stuck to each corresponding anti-corrosive layer 50 to get a more preferable corrosion-proof ability.

The laminated structural composition of the APF packing material 10 is further illustrated as follows:

(Substrate Layer)

As shown in FIG. 1, the substrate layer 20 is formed from a single-layer of or multi-layers of heat-resistant resin film(s), which is suitable for use in making as an outermost-layered material of lithium cells or batteries by a cold forming process. The heat-resistant resin film is either a stretched or a non-stretched thin film made from a polyamide (NYLON) resin or a polyester (PET) resin.

For clarity, the stretched or non-stretched thin film made from a polyamide (NYLON) resin is hereinafter referred to as a nylon film, and the stretched or non-stretched thin film made from a polyester (PET) resin is hereinafter referred to as a polyester film.

When lithium cells or batteries have the APF packing material 10 of the present invention formed as a plastic film packaging thereof, the main purpose of the substrate layer 20 of the APF packing material 10 is used to protect those intermediate layers including the aluminum foil layer 40, the anti-corrosive layer 50 and the adhesive layer 60 etc. And, the minor purpose of the substrate layer 20 is used to mark text for printing, so that the substrate layer 20 needs to have an excellent printability.

The substrate layer 20 is a polyamide (NYLON) film or a polyester (PET) film with heat resistance and has a thickness of ranging between 10 microns (μm) and 50 microns by undergoing a cold forming process. The substrate layer 20 if having a thickness less than 10 μm has shortcomings in respects of insufficiency for elongation and reduction of insulation. Disadvantages will result in that the APF packing material 10 of the present invention is formed in unqualified forming. In addition, the substrate layer 20 if having a thickness more than 50 μm is unavailable for use in making a lithium battery required for having in light weight, thin thickness, short length and small size.

(Aluminum Foil Layer)

Vapor or moisture existed in the air due to having a penetrative capability will penetrate into the interior of lithium cells or batteries easily and causes lithium cells or batteries to be unfavorable in working under normal condition, so that the life cycle of the lithium cells or batteries if under usage condition is so closely related to environmental atmospheric humidity. Thus, the APF packing material 10 of the invention required for each laminated layer thereof having a property of moisture-proof is so extremely important, wherein the aluminum foil layer 40 used in the lithium cells or batteries plays a critical component to effectively prevent from penetration of water or moisture.

The aluminum foil layer 40 is limited to have a thickness of more than 30 microns (μm), preferably ranged between 30 μm and 100 μm, and if satisfied with the required condition has an excellent moisture-proof ability.

The aluminum foil layer 40 is generally made from a kind of soft aluminum foil. However, for giving the aluminum foil layer 40 possessing a preferable pinhole resistance as well as better scalability and formability, the aluminum foil layer 40 is preferably made from an aluminum foil containing iron element and silicon element. The iron content of the aluminum foil layer 40 is preferably between 0.1 wt % and 5 wt % by weight of the aluminum foil layer 40, most preferably between 0.3 wt % and 1 wt % thereof; and the silicon content of the aluminum foil layer 40 is preferably between 0.1 wt % and 5 wt % by weight of the aluminum foil layer 40, most preferably between 0.3 wt % and 1 wt % thereof.

The aluminum foil layer 40 is preferably treated with a degreasing treatment or a chemical conversion treatment to possess a high performance of hydrofluoric acid resistance. Said chemical conversion treatment for the aluminum foil layer 40 is meant that a layer of oxide coating is grown on the surface of the aluminum foil layer 40 thereof, the said oxide coating is made from chromates, phosphates or fluoride salts, such as alkali metal chromates, alkali metal phosphates, chromium phosphate, zinc phosphate or organic/inorganic silicon oxide ($SiO_2$) etc. Among them, chromates or phosphates are preferable and chromium phosphate is more preferable to produce the oxide coating grown on the surface of the aluminum foil layer 40 thereof.

(Bonding Layer)

As shown in FIG. 1 or FIG. 2, the bonding layer 30 is used for bonding the substrate layer 20 and the aluminum foil layer 40. The bonding layer 30 is made from a polyurethane adhesive after completely cured.

(Anti-Corrosive Layer)

As shown in FIG. 1 or FIG. 2, the anti-corrosive layer 50 is formed from a conductive coating, which is coated onto either one side or both sides of the aluminum foil layer 40 and is limited to have a thickness of ranging between 10 nm and 500 nm after cured under high curing temperature.

The conductive coating is selected from the group consisting of polyaniline, polypyrrole, polythiophene and any combination thereof. The conductive coating after cured becomes the anti-corrosive layer 50 and further allows the anti-corrosive layer 50 provided with two functions including a conductive ability and a vapor-proof ability.

Moreover, after the anti-corrosive layer 50 is coated onto the aluminum foil layer 40, a thin layer of metal oxide film is further tightly grown at interface between the aluminum foil layer 40 and the anti-corrosive layer 50. The thinned metal oxide film effectively helps the aluminum foil layer 40 to have its own metal ion kept in a passive region possessed a lower electrode potential, resulted in that the aluminum foil layer 40 is thereby obtained protection from corrosion.

(Innermost Layer)

As shown in FIG. 1 or FIG. 2, the innermost layer 70 is made from a single-layered or multi-layered thermoplastic resin film. The thermoplastic resin film is a polyolefin-based polymer film, a polyolefin copolymer film or a non-stretched film made from polypropylene, polyethylene, maleic-modified acid polypropylene, ethylene-acrylic acid ester copolymer or ionic bond-containing polymer resin.

Since the innermost layer 70 is used to contact with electrolytes of a lithium battery, the innermost layer 70 must have a capability of heat seal to improve electrolyte-resisted ability when assembled to the lithium battery.

The innermost layer 70 has a thickness of ranging between 10 μm and 60 μm. The innermost layer 70 has an adverse capability of heat sealing if having a thickness less than 10 μm, resulted in that the lithium battery has unavailable electrical properties. Furthermore, the innermost layer 70 if having a thickness more than 60 μm is unavailable for use in making a lithium battery required for having in light weight, thin thickness, short length and small size.

(Adhesive Layer)

As shown in FIG. 1 or FIG. 2, the adhesive layer 60 is formed from a fluorine-containing polyurethane adhesive, more particularly from an adhesive having fluorine-containing polyurethane polyol component, being coated as an interleaved layer between the anti-corrosive layer 50 and the innermost layer 70 and finally cured.

The fluorine-containing polyurethane adhesive comprises hydroxyl-containing modified fluorocarbon resins according to a predetermined proportion to mix with polyols as a mixture as starting raw materials, and further comprises isocyanate compounds (or called isocyanates) added to react with the said mixture through a heating reaction, and finally contains a component of fluorine-containing polyurethane polyols derived from the final reaction, wherein in the course of producing the fluorine-containing polyurethane polyols a molar ratio of polyols to isocyanate compounds ranges from about 1 to 3 is used.

To produce the fluorine-containing polyurethane adhesive of the present invention, epoxy resins required having an excellent performance of high-temperature resistance as well as curing agent additives are duly measured, introduced and uniformly mixed with the said fluorine-containing polyurethane polyols, and then the fluorine-containing polyurethane adhesive of the present invention is finally obtained.

The fluorine-containing polyurethane adhesive of the present invention comprises the following components:
a) 65-92 wt % polyol composition;
b) 0.5-8.0 wt % hydroxyl-containing modified fluorocarbon resins, preferably 0.5-4.5 wt %; and
c) 5-30 wt % epoxy resin; each by weight of the fluorine-containing polyurethane adhesive.

And, the hydroxyl-containing modified fluorocarbon resin has a chemical structure as follows:

$(CFX—CYZ)_m—(CH_2—CHOH)_n$

Where, F is fluorine; X, Y, Z may be a halogen or hydrogen (H); and m, n is a positive integer greater than zero.

Said hydroxyl-containing modified fluorocarbon resin not only contains a fluorine-modified ethylene component, wherein C—F bond is reliable and has excellent properties including chemical resistance, durability, hydrophobicity and heat resistance as well as has a high hydrofluoric acid resistance, but also contains OH functional groups which are capable of being reacted with ammonium isocyanate.

Nevertheless, the fluorine-containing polyurethane adhesive of the present invention become to have a worse adhesive effect if said adhesive comprises the hydroxyl-containing modified fluorocarbon resin having C—F bonds too much. Therefore, the hydroxyl-containing modified fluorocarbon resin, preferably a hydroxyl-containing modified tetrafluorocarbon resin, having the OH value of between 30 mgKOH/g and 100 mgKOH/g is preferably chosen to react with the isocyanate compounds, resulted in that not only the fluorine-containing polyurethane adhesive of the invention improves its adhesive compatibility and strengthen its adhesive capability when used to adhere to substrate material, but also the APF packing material 10 of the invention promotes its adhesive effects more tightly among its laminated layers including between the adhesive layer 60 and the innermost layer 70 or/and between the aluminum foil layer 40 and the adhesive layer 60.

The above-mentioned epoxy resin having high-temperature resistance has an epoxy equivalent weight (EEW) ranging from 100 to 2,000, which is used to enhance the adhesive layer 60 having an excellent electrolyte solution resistance and also contribute to the aluminum foil layer 40 or/and the innermost layer 70 having the same capability thereof. The epoxy resin is a bi-functional epoxy resin or a poly-functional epoxy resin selected from the group consisting of bisphenol A epoxy resin, bisphenol F epoxy resin, butadiene epoxy resin, phenol-formaldehyde novolac epoxy resin, phenol biphenyl-fonnaldehyde novolac epoxy resin, phenol p-xylene formaldehyde novolac epoxy resin, phenol biphenylene formaldehyde novolac epoxy resin, phenol dicyclopentadiene formaldehyde novolac epoxy resin, benzaldehyde novolac epoxy resin, biphenyl-formaldehyde novolac epoxy resin, naphthalene-formaldehyde novolac epoxy resin, BPA phenol novolac epoxy resin and resorcinol ring novolac epoxy resin, and any combinations thereof. Novolac epoxy resin is chosen preferably.

The fluorine-containing polyurethane adhesive of the present invention has excellent acid-resistance and solvent-resistance, if its components are contained of biphenyl-formaldehyde novolac epoxy resin. And, the fluorine-containing polyurethane adhesive of the present invention has an excellent softness, if its components are contained of bisphenol A epoxy resin.

The fluorine-containing polyurethane adhesive of the present invention has an excellent rigidity characteristics, if its components are contained any one of phenol-formaldehyde novolac epoxy resin, biphenyl-formaldehyde novolac epoxy resin and naphthalene-formaldehyde novolac epoxy resin, because these epoxy resins have a benzene ring structure. On the contrary, the fluorine-containing polyurethane adhesive of the present invention is apt to become solidification if its components have too much quantities of any one of these epoxy resins, resulted in that it is not conducive to undergoing a puncture measurement to determine whether the APF packing material 10 of the present invention has an excellent cold forming property.

Consequently, the fluorine-containing polyurethane adhesive of the present invention is limited to contain total amount of any one of these epoxy resins ranged between 5 wt % and 15 wt %. The APF packing material 10 of the present invention has an excellent cold forming property By mixing of two or more different above-mentioned epoxy resins into a kind of blended epoxy resins, the fluorine-containing polyurethane adhesive of the present invention may contain a total amount of this kind of blended epoxy resins is ranged between 5 wt % and 30 wt %. Accordingly, the APF packing material 10 of the present invention is, if its adhesive layer 60 used the said adhesive contained of the blended epoxy resins and formed between the anti-corrosive layer 50 and the innermost layer 70, capable of being improved to have excellent physical properties including available press formability as well as electrolyte solution resistance, etc.

Taken as an illustrated example, a fluorine-containing polyurethane adhesive of the present invention is contained of 5.0-30 wt % blended epoxy resins by mixing bisphenol A epoxy resin with biphenyl-formaldehyde novolac epoxy resin via a weight ratio of 1:1 thereof, resulted in that the APF packing material 10 of the present invention has an adhesive layer 60 formed from said fluorine-containing polyurethane adhesive to promote adhesive effects generated between the adhesive layer 60 and the innermost layer 70 or/and between the aluminum foil layer 40 and the adhesive layer 60 more tightly, to promote a well-balanced electrolyte solution resistance obtained between the innermost layer 70 and the aluminum foil layer 40 more effectively, and to promote the APF packing material 10 of the present invention possessing more excellent physical properties including excellent in acid-resistance, solvent-resistance, water-resistance and heat-resistance as well as more outstanding in press formability thereof.

Polyols for use in making the above-mentioned fluorine-containing polyurethane adhesive is preferably saturated polyols having 8 to 36 carbon atoms in combinations. The polyol is selected from the group consisting of polyester polyol, polyether polyol, polycarbonate polyol, acrylic polyol and olefin opolyol, and any combination thereof.

The polyester polyol is obtained from undergoing a reaction to have an aromatic dibasic acid or an aliphatic dibasic acid reacted with an aromatic diol or an aliphatic diol, and then further reacted with isocyanates subsequently.

The aromatic dibasic acid includes isophthalic acid or terephthalic acid. The aliphatic dibasic acid includes succinic acid, tartaric acid, adipic acid, pimelic acid, suberic acid, azelaic acid or sebacic acid.

The aromatic diol is preferably benzenedimethanol. The aliphatic diols include: ethylene glycol, propylene glycol, heptane diol, octanediol, nonanediol or decanediol.

A polyurethane polyol chosen from polyester polyol is suited for making the fluorine-containing polyurethane adhesive of the present invention. Further, the polyurethane polyol is preferably a fluorine-containing polyurethane polyol with a molecular weight of from about 15,000 to 35,000, preferably from 25,000 to 30,000.

Other Additives)

(1) Curing Agent

For making the APF packing material 10 of the present invention, polyfunctional isocyanates containing aromatic polyisocyanates or aliphatic polyisocyanates are optionally chosen as a curing agent. The polyfunctional isocyanates preferably have 8 to 36 carbon atoms.

The aromatic polyisocyanate is preferably a toluene diisocyanate (TDI) or a diphenylmethane diisocyanate (MDI), and the aliphatic polyisocyanate is preferably a hexamethylene diisocyanate or an isophorone diisocyanate.

(2) Catalyst

For making the APF packing material 10 of the present invention, an organic tin (T-12), an organic bismuth, an organic zinc, an organic zirconium or a dimethyl ethanolamine is optionally chosen as a catalyst.

(3) Antioxidant

For making the APF packing material 10 of the present invention, a hindered phenol antioxidant (also known as antioxidant 1010) or a butylated hydroxytoluene (BHT) antioxidant is optionally used.

The antioxidant 1010 include tetrakis methylene(3,5-di-tert-butyl-4-hydroxy propionate)methane antioxidants, which is available from commercial products of NYNOX-1010 (made by Nan Ya Plastics Corporation, Taiwan), and prepared by undergoing a transesterification comprising a step of reacting 3,5-di-tert-butyl-4-hydroxyphenyl propionic methyl ester (also known as 3,5 methyl ester) with pentaerythritol.

The APF packing material 10 of the present invention possesses more excellent physical properties including excellent in acid-resistance, solvent-resistance, water-resistance and heat-resistance as well as more outstanding in press formability thereof. The APF packing material 10 of the present invention is not only suited for use in making as a plastic film packaging of lithium cells or batteries, but also allows the lithium cells or batteries if made therefrom provides with excellent corrosion resistance and heat resistance, and can effectively enhance the lithium batteries' service years.

The following examples are provided to illustrate the present invention without limiting the scope of the present invention. The physical properties of the APF packing material presented in the following Examples and Comparative Examples are evaluated by the following tests.

1. Evaluation of Press Formability

The samples obtained via the methods described above were cut to 150 mm*200 mm to undergo a cold forming process punched with a predetermined diameter punch. Based on the punched depth formed on the sample, the maximum punched depth of the sample is measured to evaluate whether the sample is capably undergone a cold forming process or not. The deeper punched depth measured thereof, the more available to the sample to undergo a cold forming process.

2. Evaluation of Electrolyte Solution Resistance by Proceeding Peel Strength Test An electrolyte solution was prepared by adding 1.0 M of $LiPF_6$ to a solution of ethylene carbonate/diethyl carbonate=1/1. The sample was then cut into strips of width 15 mm and dipped into the prepared electrolyte solution at temperature of 85° C. for 4 hours. To evaluate the peel strength (unit: N/mm) occurred between the aluminum foil layer and the innermost layer by a peel strength tester.

3. Evaluation of Heat Seal Strength

Two samples obtained are arranged to have its own innermost layer surface faced and contacted each other and heat sealing was then conducted for 4 seconds under conditions including 180° C. and 0.6 MPa. A universal tester with a tensile force of 1N/10 mm was used to evaluate the samples' heat seal strength. The evaluation criterion is that the higher heat seal strength is meant the less leakage of electrolyte solution leaked from the lithium battery thereof. Generally speaking, the heat seal strength of an aluminum film packaging material used for lithium battery usually should be 20N/10 mm or more.

4. Evaluation of Package Capability

An electrolyte solution was prepared by adding 1.0 M of $LiPF_6$ to a solution of ethylene carbonate/diethyl carbonate=1/1. The sample obtained via the methods described above is carried out a heat seal after injected with the electrolyte solution. To confirm the electrolyte solution if leaked from the heat sealing sample after saved for one month.

Example 1

A four beaker is provided, 100 parts by weight of polyol (with Mw=3000, available from Nan Ya Plastics Corporation, Taiwan) with 1 part by weight of hydroxyl-containing modified fluorocarbon resin are poured in the four beaker, and catalyst of organic tin (T-12), antioxidant 1010 and solvents are further added thereof and mixed uniformly for reaction, after heated up to 80° C., a measured amount of toluene diisocyanate (TDI) is then added and stirred continuously to make a reaction for 5 to 8 hours. Subsequently cooled, a fluorine-containing polyurethane polyol is therefore obtained.

Mix the obtained fluorine-containing polyurethane polyol with 10 parts by weight of biphenyl-formaldehyde novolac epoxy resin (available from commercial products of Nan Ya Plastics Co., Ltd., Taiwan) and polyfunctional isocyanates, and a fluorine-containing polyurethane adhesive is therefore obtained.

Producing an aluminum plastic film (APF) packing material provided with a laminated structure of FIG. 1 including a substrate layer, a bonding layer, an aluminum foil layer, an anti-corrosive layer, an adhesive layer and an innermost layer:

(1) the substrate layer is formed from a nylon film having a thickness of 25 microns;
(2) the innermost layer is formed from a polypropylene film having a thickness of 40 microns;

(3) the aluminum foil layer is formed from a soft aluminum foil having a thickness of 40 microns and also treated with a degreasing treatment;
(4) the anti-corrosive layer is formed from a conductive polyaniline coating (available from commercial products of Nan Ya Plastics Co., Ltd., Taiwan) and uniformly coated with a thickness of 100 nm onto the aluminum foil layer with a gravure coating apparatus, and after completely cured;
(5) the bonding layer is formed from a polyurethane adhesive (available from commercial products of Nan Ya Plastics Co., Ltd., Taiwan), which use is to have the substrate layer adhered to the surface of the aluminum foil layer not coated with the anti-corrosion layer;
(6) the adhesive layer is formed from the in advance prepared fluorine-containing polyurethane adhesive of this example, which use is to have the innermost layer adhered to the surface of the aluminum foil layer coated with the anti-corrosion layer;
(7) the aluminum plastic film (APF) packing material is therefore obtained after completely cured by undergoing a curing temperature of 60° C. for 5 days of aging time.

The results of analyzing some physical properties to the obtained aluminum plastic film (APF) are listed in Table 1.

Example 2

The fluorine-containing polyurethane adhesive contained of compositions shown in Table 1 is obtained from this example.

The aluminum plastic film (APF) packing material obtained from this example is used the same manner as Example 1, in addition to the fluorine-containing polyurethane polyol obtained from Example 1 is replaced with using 5 part by weight of hydroxyl-containing modified fluorocarbon resin.

The results of analyzing some physical properties to the obtained aluminum plastic film (APF) are listed in Table 1.

Example 3

The fluorine-containing polyurethane adhesive contained of compositions shown in Table 1 is obtained from this example.

The aluminum plastic film (APF) packing material obtained from this example is used the same manner as Example 1, in addition to the fluorine-containing polyurethane adhesive obtained from Example 1 is replaced with using a mixture of 20 parts by weight of bisphenol A epoxy resin and 20 parts by weight of phenol-formaldehyde novolac epoxy resin.

The results of analyzing some physical properties to the obtained aluminum plastic film (APF) are listed in Table 1.

Example 4

The fluorine-containing polyurethane adhesive contained of compositions shown in Table 1 is obtained from this example.

The aluminum plastic film (APF) packing material obtained from this example is used the same manner as Example 1, in addition to the fluorine-containing polyurethane adhesive obtained from Example 1 is replaced with using a mixture of 20 parts by weight of bisphenol A epoxy resin and 20 parts by weight of naphthalene-formaldehyde novolac epoxy resin.

The results of analyzing some physical properties to the obtained aluminum plastic film (APF) are listed in Table 1.

Example 5

The fluorine-containing polyurethane adhesive contained of compositions shown in Table 1 is obtained from this example.

The aluminum plastic film (APF) packing material obtained from this example is used the same manner as Example 1, in addition to the fluorine-containing polyurethane adhesive obtained from Example 1 is replaced with using 20 parts by weight of bisphenol A epoxy resin.

The results of analyzing some physical properties to the obtained aluminum plastic film (APF) are listed in Table 1.

Example 6

The fluorine-containing polyurethane adhesive contained of compositions shown in Table 1 is obtained from this example.

The aluminum plastic film (APF) packing material obtained from this example is used the same manner as Example 1, in addition to the fluorine-containing polyurethane adhesive obtained from Example 1 is replaced with using a mixture of 10 parts by weight of bisphenol A epoxy resin and 10 parts by weight of biphenyl-formaldehyde novolac epoxy resin.

The results of analyzing some physical properties to the obtained aluminum plastic film (APF) are listed in Table 1.

Example 7

The fluorine-containing polyurethane adhesive contained of compositions shown in Table 1 is obtained from this example.

The aluminum plastic film (APF) packing material obtained from this example is used the same manner as Example 1, in addition to the fluorine-containing polyurethane adhesive obtained from Example 1 is replaced with using a mixture of 20 parts by weight of bisphenol A epoxy resin and 20 parts by weight of biphenyl-formaldehyde novolac epoxy resin.

The results of analyzing some physical properties to the obtained aluminum plastic film (APF) are listed in Table 1.

Comparative Example 1

A four beaker is provided, 100 parts by weight of polyol (with Mw=3000, available from Nan Ya Plastics Corporation, Taiwan) with catalyst of organic tin (T-12), antioxidant 1010 and solvents are poured in the four beaker and mixed uniformly for reaction, after heated up to 80° C., a measured amount of tolulene diisocyanate (TDI) is then added and stirred continuously to make a reaction for 5 to 8 hours. Subsequently cooled, a polyurethane polyol is therefore obtained.

Mix the obtained polyurethane polyol with polyfunctional isocyanates, and a polyurethane adhesive is therefore obtained.

The aluminum plastic film (APF) packing material obtained from this Comparative Example is used the same manner as Example 1, in addition to the fluorine-containing polyurethane adhesive obtained from Example 1 is replaced with using the polyurethane adhesive obtained from this Comparative Example.

The results of analyzing some physical properties to the obtained aluminum plastic film (APF) are listed in Table 1.

Comparative Exampe 2

A four beaker is provided, 100 parts by weight of polyol (with Mw=3000, available from Nan Ya Plastics Corporation, Taiwan) with catalyst of organic tin (T-12), antioxidant 1010 and solvents are poured in the four beaker and mixed uniformly for reaction, after heated up to 80° C., a measured amount of tolulene diisocyanate (TDI) is then added and stirred continuously to make a reaction for 5 to 8 hours. Subsequently cooled, a polyurethane polyol is therefore obtained.

Mix the obtained polyurethane polyol with 20 parts by weight of biphenyl-formaldehyde novolac epoxy resin (available from commercial products of Nan Ya Plastics Co., Ltd., Taiwan) and polyfunctional isocyanates, and a polyurethane adhesive is therefore obtained.

The aluminum plastic film (APF) packing material obtained from this Comparative Example is used the same manner as Comparative Example 1.

The results of analyzing some physical properties to the obtained aluminum plastic film (APF) are listed in Table 1.

Comparative Example 3

A four beaker is provided, 100 parts by weight of polyol (with Mw=3000, available from Nan Ya Plastics Corporation, Taiwan) and 1 parts by weight of hydroxyl-containing modified fluorocarbon resin with catalyst of organic tin (T-12), antioxidant 1010 and solvents are poured in the four beaker and mixed uniformly for reaction, after heated up to 80° C., a measured amount of tolulene diisocyanate (TDI) is then added and stirred continuously to make a reaction for 5 to 8 hours. Subsequently cooled, a fluorine-containing polyurethane polyol is therefore obtained as a polyurethane adhesive.

The aluminum plastic film (APF) packing material obtained from this Comparative Example is used the same manner as Comparative Example 1.

The results of analyzing some physical properties to the obtained aluminum plastic film (APF) are listed in Table 1.

Comparative Example 4

By the same manner as Example 7 in addition to the aluminum foil layer free from being coated an anti-corrosive layer thereof.

The results of analyzing some physical properties to the obtained aluminum plastic film (APF) are listed in Table 1.

Comparative Example 5

The fluorine-containing polyurethane adhesive contained of compositions shown in Table 1 is obtained from this Comparative Example.

The aluminum plastic film (APF) packing material obtained from this Comparative Example is used the same manner as Example 1, in addition to the fluorine-containing polyurethane polyol obtained from Example 1 is replaced with using 10 part by weight of hydroxyl-containing modified fluorocarbon resin.

The results of analyzing some physical properties to the obtained aluminum plastic film (APF) are listed in Table 1.

Comparative Example 6

The fluorine-containing polyurethane adhesive contained of compositions shown in Table 1 is obtained from this Comparative Example.

The aluminum plastic film (APF) packing material obtained from this Comparative Example is used the same manner as Example 1, in addition to the fluorine-containing polyurethane adhesive contained of 20 parts by weight of biphenyl-formaldehyde novolac epoxy resin.

The results of analyzing some physical properties to the obtained aluminum plastic film (APF) are listed in Table 1.

Comparative Example 7

The fluorine-containing polyurethane adhesive contained of compositions shown in Table 1 is obtained from this Comparative Example.

The aluminum plastic film (APF) packing material obtained from this Comparative Example is used the same manner as Example 7, in addition to the fluorine-containing polyurethane adhesive contained of 20 parts by weight of naphthalene-formaldehyde novolac epoxy resin.

The results of analyzing some physical properties to the obtained aluminum plastic film (APF) are listed in Table 1.

Comparative Example 8

By the same manner as Example 7 in addition to the aluminum foil layer treated with a chromate treatment thereof.

The results of analyzing some physical properties to the obtained aluminum plastic film (APF) are listed in Table 1.

Comparative Example 9

The aluminum plastic film (APF) packing material obtained from this Comparative Example is used the same manner as Comparative Example 8, in addition to the polyurethane adhesive obtained by mixing the polyurethane polyol of Comparative Example 1 with 20 parts by weight of bisphenol A epoxy resin, 20 parts by weight of biphenyl-formaldehyde novolac epoxy resin (available from commercial products of Nan Ya Plastics Co., Ltd., Taiwan) and polyfunctional isocyanates.

The results of analyzing some physical properties to the obtained aluminum plastic film (APF) are listed in Table 1.

Comparative Example 10

The aluminum plastic film (APF) packing material obtained from this Comparative Example is used the same manner as Comparative Example 8, in addition to the polyurethane adhesive obtained by mixing the polyurethane polyol of Comparative Example 1 with 20 parts by weight of bisphenol A epoxy resin, 20 parts by weight of phenol-formaldehyde novolac epoxy resin (available from commercial products of Nan Ya Plastics Co., Ltd., Taiwan) and polyfunctional isocyanates.

The results of analyzing some physical properties to the obtained aluminum plastic film (APF) are listed in Table 1.

Comparative Example 11

The aluminum plastic film (APF) packing material obtained from this Comparative Example is used the same manner as Comparative Example 8, in addition to the polyurethane adhesive obtained by mixing the polyurethane polyol of Comparative Example 1 with 20 parts by weight of bisphenol A epoxy resin, 20 parts by weight of naphthalene-formaldehyde novolac epoxy resin (available from commercial products of Nan Ya Plastics Co., Ltd., Taiwan) and polyfunctional isocyanates.

The results of analyzing some physical properties to the obtained aluminum plastic film (APF) are listed in Table 1.

TABLE 1

| Item | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Adhesive layer | polyol Mw = 3000 | 100 | 100 | 100 | 100 | 100 | 100 | 100 | 100 | 100 | 100 |
| | hydroxyl-containing modified fluorocarbon resin | 1 | 5 | 1 | 1 | 1 | 1 | 1 | 0 | 0 | 1 |
| | Epoxy A[1] | 0 | 0 | 20 | 0 | 0 | 0 | 0 | 0 | 0 | 0 |
| | Epoxy B[2] | 0 | 0 | 0 | 20 | 0 | 0 | 0 | 0 | 0 | 0 |
| | Epoxy C[3] | 10 | 10 | 0 | 0 | 0 | 10 | 20 | 0 | 10 | 0 |
| | Epoxy D[4] | 0 | 0 | 20 | 20 | 20 | 10 | 20 | 0 | 0 | 0 |
| Aluminum foil layer | Ungreased treatment | yes | yes | yes | yes | yes | yes | yes | yes | yes | yes |
| | Anti-corrosive layer Treatment | yes | yes | yes | yes | yes | yes | yes | yes | yes | yes |
| | Cr Treatment | — | — | — | — | — | — | — | — | — | — |
| APF packing material physical property | Heat Seal Strength[5] (N/10 mm) | 41 | 42 | 42 | 42 | 40 | 40 | 41 | 42 | 39 | 41 |
| | maximum punched depth (mm) | >5 | >5 | >5 | >5 | >5 | >5 | >5 | >5 | >4 | >5 |
| | Press Formability | good | good | good | good | good | good | good | good | good | good |
| | Electrolyte solution resistance[6] (N/mm) | 5.2 | 4.2 | 4.6 | 5.5 | 5.1 | 5.5 | 6.6 | 2.0 | 4.8 | 3.5 |
| | Package Capability | good | good | good | good | good | good | good | good | good | poor |
| Overall evaluation | | good | good | good | good | good | good | very good | very poor | poor | poor |

| Item | | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|
| Adhesive layer | polyol Mw = 3000 | 100 | 100 | 100 | 100 | 100 | 100 | 100 | 100 |
| | hydroxyl-containing modified fluorocarbon resin | 1 | 10 | 1 | 1 | 1 | 0 | 0 | 0 |
| | Epoxy A[1] | 0 | 0 | 0 | 0 | 0 | 0 | 20 | 0 |
| | Epoxy B[2] | 0 | 0 | 0 | 20 | 0 | 0 | 0 | 20 |
| | Epoxy C[3] | 20 | 10 | 20 | 0 | 20 | 20 | 0 | 0 |
| | Epoxy D[4] | 20 | 0 | 0 | 0 | 20 | 20 | 20 | 20 |
| Aluminum foil layer | Ungreased treatment | yes | yes | yes | yes | yes | yes | yes | yes |
| | Anti-corrosive layer Treatment | — | yes | yes | yes | — | — | — | — |
| | Cr Treatment | — | — | — | — | yes | yes | yes | yes |
| APF packing material physical property | Heat Seal Strength[5] (N/10 mm) | 41 | 41 | 41 | 42 | 40 | 41 | 40 | 40 |
| | maximum punched depth (mm) | >5 | >5 | >4 | >3.5 | >5 | >5 | >4 | >5 |
| | Press Formability | good | good | good | poor | good | good | good | good |
| | Electrolyte solution resistance[6] (N/mm) | Peel off | 3.5 | 6.2 | 3.8 | 6.5 | 5.5 | 4.0 | 4.3 |
| | Package Capability | poor | poor | good | poor | good | good | good | good |
| Overall evaluation | | very poor | poor | poor | very poor | good | good | poor | poor |

Remarks:
[1]Epoxy A represents phenol-formaldehyde novolac epoxy;
[2]Epoxy B represents naphthalene-formaldehyde novolac epoxy resin;
[3]Epoxy C represents biphenyl-formaldehyde novolac epoxy resin;
[4]Epoxy D represents bisphenol A epoxy resin;
[5]Two samples obtained are arranged to have its own innermost layer surface faced and contacted each other and heat sealing was then conducted for 4 seconds under conditions including 180° C. and 0.6 MPa. A universal tester with a tensile force of 1N/10 mm was used to evaluate the samples' heat seal strength.
[6]Sample cut into strip of width 15 mm and dipped into a prepared electrolyte solution at temperature of 85° C. for 4 hours. To evaluate the peel strength occurred between the aluminum foil layer and the innermost layer by a peel strength tester.

Conclusion:

In the course of producing the aluminum plastic film (APF) packing material, Examples 1-7 use fluorine-containing polyurethane adhesive contained of epoxy resin, more particularly contained of hydroxyl-containing modified fluorocarbon resin, to form of the adhesive layer thereof:

1. In comparison to Comparative Example 3, it teaches that Examples 1-7 use fluorine-containing polyurethane adhesive contained of epoxy resin to form of the adhesive layer thereof, which are capable to contribute the aluminum foil layer or/and the innermost layer of the produced APF packing material to get an excellent electrolyte solution resistance effectively.

2. To compare Example 1 with Comparative Example 2, it teaches that the Example 1 uses fluorine-containing polyurethane adhesive contained of hydroxyl-containing modified fluorocarbon resin to form of the adhesive layer thereof, which is capable to contribute the aluminum foil layer or/and the innermost layer of the produced APF packing material to get an excellent electrolyte solution resistance effectively.

3. In view of Examples 1-2 and Comparative Example 5, it observes that the used fluorine-containing polyurethane adhesive thereof, if contained of hydroxyl-containing modified fluorocarbon resin being in more increased weight to get C—F bonds more and more, become to contribute the aluminum foil layer or/and the innermost layer of the produced APF packing material to get an adhesive effect worse and worse.

4. In view of Examples 3-5 and Example 7, it observes that the used fluorine-containing polyurethane adhesive is contained of biphenyl-formaldehyde novolac epoxy resin to form of the adhesive layer thereof, which is capable to contribute the aluminum foil layer or/and the innermost layer of the produced APF packing material to get a more preferably excellent electrolyte solution resistance. It is because among epoxy resins the biphenyl-formaldehyde novolac epoxy resin has excellent acid-resistance and solvent-resistance.

Further, to have Example 1 compared with Comparative Example 6, it teaches that the used fluorine-containing polyurethane adhesive limits to singly contain too much amount of biphenyl-formaldehyde novolac epoxy resin only, otherwise the produced APF packing material is going to get a worse press formability resulted from a measurement of punched depth.

5. In view of Examples 1-2 and Examples 5-7, it observes that the used fluorine-containing polyurethane adhesive is contained of bisphenol A epoxy resin to form of the adhesive layer thereof, which is capable to contribute the produced APF packing material to get a more preferably excellent press formability resulted from a measurement of punched depth. It is because among epoxy resins the bisphenol A epoxy resin has an excellent structure of softness.

It further teaches that the used fluorine-containing polyurethane adhesive contains both bisphenol A epoxy resin and biphenyl-formaldehyde novolac epoxy resin limited to a total amount ranging between 5 wt % and 30 wt % thereof, which is capable to contribute the produced APF packing material to get both of excellent electrolyte solution resistance and excellent press formability resulted from a measurement of punched depth.

6. In view of Examples 3, 4 and 7, it observes that the used fluorine-containing polyurethane adhesive is respectively contained of blended epoxy resins by mixing bisphenol A epoxy resin with phenol-formaldehyde novolac epoxy resin, naphthalene-formaldehyde novolac epoxy resin or biphenyl-formaldehyde novolac epoxy resin via a weight ratio of 1:1 to form of the adhesive layer thereof, which is not only capable to contribute the produced APF packing material to get a more preferably excellent press formability resulted from a measurement of punched depth, but also capable to contribute the aluminum foil layer or/and the innermost layer of the produced APF packing material to get an excellent electrolyte solution resistance effectively.

7. The Example 7 shows the produced APF packing material has its aluminum foil layer treated with a degreasing treatment and coated with an anti-corrosive layer formed from a polyaniline conductive coating. Contrarily, the Comparative Example 4 shows the produced APF packing material has its aluminum foil layer treated with a degreasing treatment only, not further coated with a polyaniline conductive coating.

To compare Example 7 with Comparative Example 4, it teaches that the produced APF packing material is, if had its aluminum foil layer no further treated with a polyaniline conductive coating, incapable to contribute the aluminum foil layer or/and the innermost layer of the produced APF packing material to get a preferable electrolyte solution resistance, i.e., the produced APF packing material not has a capability of acid-resistance.

8. In addition to using fluorine-containing polyurethane adhesive with the same components as the Example 7, the Comparative Example 8 shows the produced APF packing material has its aluminum foil layer treated with a degreasing treatment and coated with a chemical conversion coatings formed from phosphoric acid chromates.

To compare Example 7 with Comparative Example 8, no matter both has the same press formability, it teaches that the produced APF packing material is capable to contribute the aluminum foil layer or/and the innermost layer thereof to get a preferable electrolyte solution resistance, if the produced APF packing material has its aluminum foil layer further treated with a polyaniline conductive coating in instead of being treated with chemical conversion coatings.

9. To compare Example 4 with Comparative Example 7, it teaches that the used fluorine-containing polyurethane adhesive for use in making adhesive layer limits to singly contain naphthalene-formaldehyde novolac epoxy resin only in instead of further mixing with bisphenol A epoxy resin, the produced APF packing material is going to get a worse press formability resulted from a measurement of punched depth.

10. Any Comparative Examples 9, 10 or 11 not only allows to use fluorine-containing polyurethane adhesive no contained of hydroxyl-containing modified fluorocarbon resin to form of the adhesive layer thereof, but also allows the produced APF packing material has its aluminum foil layer treated with phosphoric acid chromates in instead of a polyaniline conductive coating.

To compare Examples 7 and 3-4 with Comparative Examples 9, 10 and 11 respectively, it teaches that the produced APF packing material is capable to contribute the aluminum foil layer or/and the innermost layer thereof to get a preferable electrolyte solution resistance, if the produced APF packing material uses fluorine-containing polyurethane adhesive contained of hydroxyl-containing modified fluorocarbon resin to form of the adhesive layer thereof and has its aluminum foil layer further treated with a polyaniline conductive coating in instead of being treated with chemical conversion coatings.

What is claimed is:

1. An aluminum plastic film packaging material used for a lithium battery at least comprising:

a substrate layer provided with a capability of heat resistance, and formed from a nylon film or a polyester film having a thickness of ranging between 10 μm and 50 μm;

an aluminum foil layer bonded to the substrate layer, provided with a capability of hydrofluoric acid resistance, and formed from a soft aluminum foil containing 0.1-5 wt % of iron element and 0.1-5 wt % of silicon element and having a foil thickness of ranging between 30 μm and 100 μm;

an innermost layer provided with a capability of heat seal for use in contact with electrolytes of a lithium battery, and formed from a polyolefin-based polymer film having a thickness of ranging between 10 μm and 60 μm;

wherein the improvement comprises:

an anti-corrosive layer coated onto one side of the aluminum foil layer, and formed from a conductive coating having a thickness of ranging between 10 nm and 500 nm; and an adhesive layer coated as an interleaved layer between the anti-corrosive layer and the innermost layer, and formed from a fluorine-containing polyurethane bonding adhesive comprising:

a) 65-92 wt % polyol composition including a fluorine-containing polyurethane polyol with a molecular weight from 25,000 to 30,000;

b) 0.5-8.0 wt % hydroxyl-containing modified fluorocarbon resins; and c) 5-30 wt % epoxy resin; each by weight of the fluorine-containing polyurethane adhesive, wherein the hydroxyl-containing modified fluorocarbon resin has a chemical structure as follows:

$$(CFX\text{---}CYZ)_m\text{---}(CH_2\text{---}CHOH)_n$$

Where, F is fluorine; X, Y, Z is a halogen or hydrogen (H); and m, n is a positive integer greater than zero.

2. The aluminum plastic film packaging material as claimed in claim 1, wherein the fluorine-containing polyurethane bonding adhesive is contained of the epoxy resin selected from the group consisting of bisphenol A epoxy resin, bisphenol F epoxy resin, butadiene epoxy resin, phenol-formaldehyde novolac epoxy resin, phenol biphenyl-fonnaldehyde novolac epoxy resin, phenol p-xylene formaldehyde novolac epoxy resin, phenol biphenylene formaldehyde novolac epoxy resin, phenol dicyclopentadiene formaldehyde novolac epoxy resin, benzaldehyde novolac epoxy resin, biphenyl-formaldehyde novolac epoxy resin, naphthalene-formaldehyde novolac epoxy resin, BPA phenol novolac epoxy resin, resorcinol ring novolac epoxy resin and any combinations thereof.

* * * * *